No. 744,014. PATENTED NOV. 10, 1903.
E. W. LEWIS & J. S. UNGER.
METHOD OF CUTTING STEEL PLATES.
APPLICATION FILED MAY 19, 1903.
NO MODEL.

WITNESSES
INVENTORS

No. 744,014.

Patented November 10, 1903.

UNITED STATES PATENT OFFICE.

EDWIN W. LEWIS AND JOHN S. UNGER, OF MUNHALL, PENNSYLVANIA.

METHOD OF CUTTING STEEL PLATES.

SPECIFICATION forming part of Letters Patent No. 744,014, dated November 10, 1903.

Application filed May 19, 1903. Serial No. 157,767. (No model.)

*To all whom it may concern:*

Be it known that we, EDWIN W. LEWIS and JOHN S. UNGER, of Munhall, Allegheny county, Pennsylvania, have invented a new and useful Method of Cutting Steel Plates, of which the following is a full, clear, and exact description, reference being had to the accompanying drawings, forming part of this specification, in which—

Figure 1:
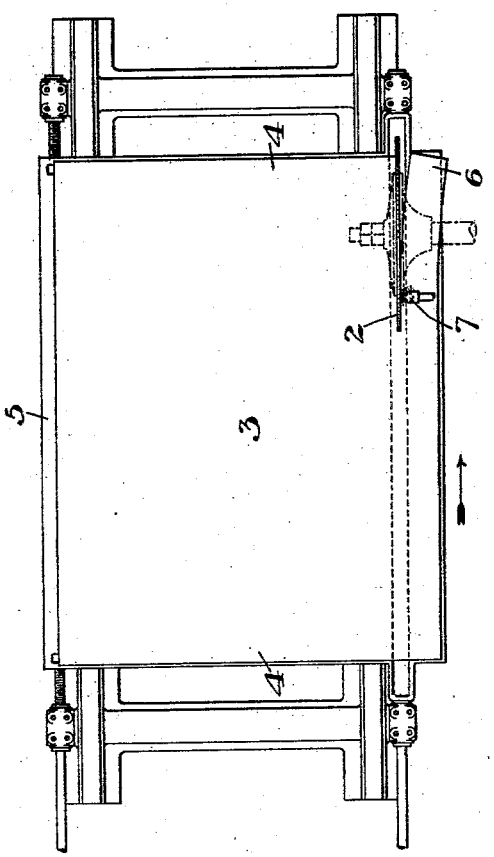
Figure 2:
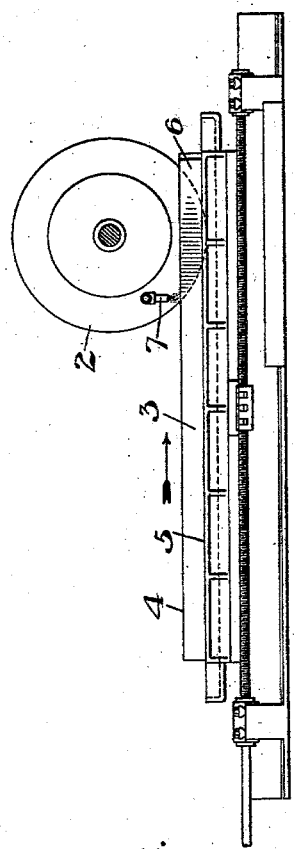

Figure 1 is a plan view showing one form of apparatus arranged to carry out our invention, and Fig. 2 is a side elevation of the same.

Our invention relates to the sawing of steel plates, and more particularly to sawing the face portion of steel plates, such as armor-plate, having the glassy hard character imparted by carburizing and liquid-quenching. In some of the features, however, the method is not limited to the sawing of face-hardened armor-plate, but relates to the sawing of any steel plate.

This application includes subject-matter set forth in our previous applications, Serial No. 137,156, filed December 30, 1902, Serial No. 137,155, filed December 30, 1902, and Serial No. 72,823, filed August 21, 1901.

In the art of finishing face-hardened armor-plate the practice heretofore has been to carburize the face portion by the Harvey process or any other desirable method. The plate is then cut to nearly the final shape and size by slowly-moving tools, such as planers. The plate, which is now slightly larger than its final size, is then heated and water-quenched, thus making the carburized face portion of a glassy hardness, and to finish the plate to the exact form desired it is turned over with the hardened face down and is cut with a reciprocating or slow-moving cutter through the softer back and down to the cemented and water-quenched portion. This portion cannot be worked by any ordinary cutting-tool and in practice is cut away by the slow-grinding action of an emery-wheel. These two cutting operations, one before the water-quenching and one after the water-quenching, have been necessary, because no ordinary cutting-tool will act upon the glassy hard water-quenched face portion, and hence this face portion is brought to nearly the final form before water-quenching and then finished to final form by grinding. The action of ordinary cutting-tools upon the carburized face is very slow and difficult, even before water-quenching, and the expense of finishing the plates has been great.

In finishing armor-plate according to our invention the plate is carburized on its face by the Harveyizing or other desirable method. The plate is then forged in the usual manner, if desired, and then heated and water-quenched without any previous cutting. The rough plate, with its carburized and water-hardened face, is then cut to the desired form by the action of a revolving steel disk, which saws the plate to the desired size and shape. This revolving saw cuts through both the softer back and the glassy hard-face portion with comparative rapidity and does away with the necessity for any cutting of the plate before water-quenching.

In the sawing of homogeneous steel plates it has been found that the saw clogged and stuck in the kerf after entering a short distance, thus preventing successful sawing. We have found that this difficulty was due to the pinching action on the saw of the piece being cut off and that we can prevent such action by applying water to the cut-off portion in such a way as to contract the piece being cut off and bend it away from the saw.

In the drawings, in which we show one form of apparatus for carrying out our invention, 2 represents the saw; 3, the plate to be cut, having the cemented and water-hardened face portion 4.

5 is the moving table, carrying the plate.

6 is the strip or piece being cut from the plate, and 7 designates a nozzle through which water is discharged against the strip or piece being cut from the plate.

In using the apparatus the table is fed progressively toward the saw in the direction of the length of the cut, and the saw is revolved at a rate of peripheral speed of preferably four or five miles per minute, though the speed may be varied, as desired. The binding of the saw in the kerf is prevented by a stream of water directed against the piece being cut from the plate, thus causing it to bend outwardly and preventing binding. It will be noticed that in the apparatus shown the chord of the circumference of the saw at the sawing-point is less than the length of the plate being sawed.

The principal advantages of our invention consist in the great reduction in the cost of finishing, which results from doing away with the necessity for the first step of cutting the plate before water-quenching.

The softer back of the plate may be cut by ordinary tools down to the face-hardened portion and the latter then cut off by our method. The glassy hard-face portion may be produced by other methods, and many variations may be made in the form and arrangement of the sawing apparatus without departing from our invention.

We claim—

1. The method of finishing armor-plate consisting in carburizing the face thereof, liquid-quenching the carburized portion, and then cold-sawing through the plate by a rapidly-revolving metal disk; substantially as described.

2. The method of finishing armor-plate consisting in carburizing the face thereof, reforging the plate, liquid-quenching the carburized face, and then cold-sawing through the plate by a rapidly-revolving metal disk; substantially as described.

3. The method of shaping armor-plate having a glassy hard-face portion of the character imparted by carburizing and liquid-quenching, consisting in severing the face portion of the plate by passing a rapidly-revolving cold-saw through it, substantially as described.

4. The method of shaping armor-plate having a glassy hard-face portion of the character imparted by carburizing and liquid-quenching, consisting in severing the face portion of the plate by applying a rapidly-revolving cold-saw having the chord of its circumference at the sawing-point of less length than the plate, and passing it through the plate; substantially as described.

5. The method herein described of cutting steel plates, which consists in applying to such plate a rapidly-revolving steel surface, passing it along and through the plate, and cooling the piece cut from the plate by application of a cooling fluid, and causing it thereby to curve outwardly and afford clearance to the saw; substantially as described.

6. The method of finishing armor-plate consisting in carburizing the face, liquid-quenching the carburized portion, cold-sawing through the plate, and supplying a cooling fluid to the strip or portion cut from the plate during sawing, to prevent binding of the saw in the kerf; substantially as described.

In testimony whereof we have hereunto set our hands.

EDWIN W. LEWIS.
JOHN S. UNGER.

Witnesses:
L. M. REDMAN,
H. M. CORWIN.